(12) United States Patent
Harscoet (10) Patent No.: US 7,150,005 B2
(45) Date of Patent: Dec. 12, 2006

(54) METHOD AND SYSTEM FOR GLOBAL CONSTANT MANAGEMENT FOR MEMORY

(75) Inventor: Philippe Harscoet, Santa Clara, CA (US)

(73) Assignee: Beryl Technical Assays, LLC, Las Vegas, NV (US)

( * ) Notice: Subject to any disclaimer, the term of this patent is extended or adjusted under 35 U.S.C. 154(b) by 257 days.

(21) Appl. No.: 10/327,482

(22) Filed: Dec. 19, 2002

(65) Prior Publication Data

US 2003/0088851 A1    May 8, 2003

Related U.S. Application Data

(63) Continuation of application No. 09/347,037, filed on Jul. 2, 1999, now abandoned.

(51) Int. Cl.
*G06F 9/44* (2006.01)
(52) U.S. Cl. .................. 717/120; 717/114; 717/116
(58) Field of Classification Search ............. 717/100, 717/101, 108, 120, 121, 122, 148, 114–118, 717/162–165
See application file for complete search history.

(56) References Cited

U.S. PATENT DOCUMENTS

| | | | |
|---|---|---|---|
| 5,784,553 A | 7/1998 | Kolawa et al. ............... 414/38 |
| 5,966,542 A | 10/1999 | Tock ........................... 717/166 |
| 5,987,256 A | 11/1999 | Wu et al. ..................... 717/146 |
| 6,047,125 A | 4/2000 | Agesen et al. ............... 717/148 |
| 6,066,181 A | 5/2000 | DeMaster .................... 717/148 |
| 6,081,665 A * | 6/2000 | Nilsen et al. ................ 717/116 |
| 6,083,276 A * | 7/2000 | Davidson et al. ............ 717/107 |
| 6,110,226 A | 8/2000 | Bothner ....................... 717/153 |
| 6,151,598 A * | 11/2000 | Shaw et al. .................... 707/3 |
| 6,260,187 B1 | 7/2001 | Cirne ........................... 717/110 |
| 6,295,643 B1 | 9/2001 | Brown et al. ................ 717/148 |
| 6,317,869 B1 | 11/2001 | Adl-Tabatabai et al. .... 717/148 |
| 6,317,872 B1 * | 11/2001 | Gee et al. .................... 717/152 |
| 6,327,702 B1 | 12/2001 | Sauntry et al. .............. 717/118 |
| 6,330,709 B1 * | 12/2001 | Johnson et al. .............. 717/100 |
| 6,374,286 B1 * | 4/2002 | Gee et al. .................... 718/108 |

(Continued)

OTHER PUBLICATIONS

Chase et al, "Analysis of pointers and structures" ACM SIGPLAN Conf. on Prog. Language Design and Implemention, pp. 296-310, 1990.*

(Continued)

*Primary Examiner*—Anil Khatri (57) ABSTRACT

Method and system for global constant management. A method of operating a computer is described in which, for data structures and a set of data structures, the date structure is received from a first memory. The data structure includes one or more sets of instructions and a set of one or more constants. The data structure is stored in a second memory. If constants from the data structure have not been stored in other data structures in the second memory, other than the first data structure, then constants in the data structures are stored in data structures in second memory. The constants from the first data structure in the second memory are replaced with links to respective other data structures in the second memory. In one example system, the data structure from the first memory comprises a Java class, and the sets of instructions comprise Java methods. The constants from the data structure in the first memory may comprise a constant pool.

32 Claims, 3 Drawing Sheets

U.S. PATENT DOCUMENTS

| | | | |
|---|---|---|---|
| 6,507,946 B1 * | 1/2003 | Alexander et al. | 717/145 |
| 6,519,764 B1 * | 2/2003 | Atkinson et al. | 717/120 |
| 6,606,744 B1 * | 8/2003 | Mikurak | 717/174 |
| 6,611,844 B1 * | 8/2003 | Saulpaugh et al. | 707/100 |
| 6,718,546 B1 * | 4/2004 | Johnson | 717/169 |
| 6,760,907 B1 * | 7/2004 | Shaylor | 717/158 |
| 6,763,440 B1 * | 7/2004 | Traversat et al. | 711/159 |
| 6,785,882 B1 * | 8/2004 | Goiffon et al. | 717/120 |
| 6,789,251 B1 * | 9/2004 | Johnson | 717/100 |
| 6,871,345 B1 * | 3/2005 | Crow et al. | 717/175 |
| 6,925,637 B1 * | 8/2005 | Thomas et al. | 717/151 |
| 6,968,549 B1 * | 11/2005 | Harscoet | 717/166 |

OTHER PUBLICATIONS

Demsky et al, "Automatic detection and repair of errors in data structure", ACM OOPSLA, pp. 78-95, 2003.*

Inagaki et al, "Stride prefetching by dyanmically inspecting objects", ACM PLDI, PP. 269-277, 2003.*

Rogers et al, "Supporting dynamic data structures on distributed memory machines", ACM Trans. Prog. lang. and Sys. vol. 17, No. 2, pp. 233-263, 1995.*

* cited by examiner

METHOD AND SYSTEM FOR GLOBAL CONSTANT MANAGEMENT FOR MEMORY

CROSS REFERENCE TO RELATED APPLICATION

This application is a continuation of U.S. application Ser. No. 09/347,037 filed Jul. 2, 1999 now abandoned. This application is related to application Ser. No. 09/347,473, filed Jul. 2, 1999, entitled, Method and System for Dynamically Loading Data Structures into Memory With Global Constant Pool, which is hereby incorporated herein by reference in its entirety.

BACKGROUND

1. Field of the Invention

The invention relates to managing constants in memory, in particular for constants associated with data structures into memory.

2. Description of Related Art

Java is an object oriented programming language, which is often used in a network environment, for example, the Internet. Java's source code is written, and then the source code is compiled into a series of class files. The class files can be stored remotely, for example on a server and then be loaded dynamically when needed on a local system. The class files include bytecode, a set of instructions lower level than the original Java source code, yet higher level than code specific to a particular processor. This helps to allow Java to be particularly suited for the network environment, so that a variety of different local systems can run the Java programs from a network server. Java classes can be distributed to a variety of different systems, as may be connected to the Internet. For example, when encountering a Web page via a browser, a Java application may be initiated, which would involve the Java class files being loaded via the Internet on to the local system.

A local system that runs the Java classes needs functionality to interpret the Java bytecode. One system that provides such functionality is a Java Virtual Machine. The Java Virtual Machine loads the respective classes from the class files and executes methods as needed. The Java Virtual Machine is typically implemented in software, often associated with a browser, but may also be implemented in hardware.

In order to provide useful network applications to a wide variety of systems, it is desirable to be able to run Java applications on small systems that may not have a large amount of memory. Because such systems are small and may not possess excessive memory, it is helpful to conserve the use of memory used by the Java application, in particular the use of random access memory (read-write memory). One approach is to preload classes into memory, loading into read-only memory the methods and data that do not vary, while loading into random access memory varying data and methods. Such an approach is described in U.S. Pat. No. 5,815,718, entitled "Method And System For Loading Classes In Read-Only Memory," invented by T. Tock, (hereinafter, "Tock"), which is incorporated herein by reference in its entirety. Classes in Java include typically a number of constants. These constants may require a significant amount of memory on the local system that is running the Java program. The Tock patent indicates that the offline class loader eliminates duplicate constants, in order to combine the constant pools of all the classes in a space efficient manner.

It would be desirable to provide a method and a system which overcome the deficiencies of the prior art.

SUMMARY OF THE INVENTION

The invention includes a method and system for global constant management. A method of operating a computer is described in which, for data structures and a set of data structures, the date structure is received from a first memory. The data structure includes one or more sets of instructions and a set of one or more constants. The data structure is stored in a second memory. If constants from the data structure have not been stored in other data structures in the second memory, other than the first data structure, then constants in the data structures are stored in data structures in second memory. The constants from the first data structure in the second memory are replaced with links to respective other data structures in the second memory.

In one example system, the data structure from the first memory comprises a Java class, and the sets of instructions comprise Java methods. The constants from the data structure in the first memory may comprise a constant pool. Receiving the data structure from a first memory may comprise receiving the data structure from a server over the Internet.

One embodiment of the invention comprises a computer system that includes a processor and a memory. The memory includes a set of objects, each object including a constant, and a set of classes. The classes correspond to classes from a class file, in which classes have sets of methods and sets of constants. The memory includes a first class in the set of classes that has a link to an object in a set of objects. The object includes a constant from a class in a class file that corresponds to the first class. The first class in the memory does not include the constant. The memory includes a second class in the set of classes that has a link to the object in the set of objects. A class in the class file that corresponds to the second class has the constant. The second class in the memory does not include the constant.

According to one embodiment of the invention, the class file that corresponds to the first class in the set of classes includes a constant pool. The constant pool includes strings and constants other than strings. The first class in the memory includes constants other than strings and links to objects in the set of objects that include strings corresponding to strings in the constant pool in the class file.

Embodiments of the invention include computer readable code that implements the methods described herein. According to one embodiment of the invention, the computer readable code is embodied in a computer readable medium, and according to another embodiment in the invention, the computer readable code is embodied in a carrier wave that may be transmitted from one computer system to another, for example, over a network.

DESCRIPTION OF THE DRAWINGS

The invention is illustrated by way of example, and not limitation in the drawings.

DETAILED DESCRIPTION

The following is a description of embodiments of the invention. The embodiments shown help to illustrate the invention. However, it is not intended that the invention be limited to the precise embodiments shown.

Java classes are stored in Java class files. Each class typically includes a constant pool, which contains a set of constants used by the class. Constants from one class are often duplicated in other classes. This duplication can result in a waste of memory if the constants, particularly, large constants, are stored redundantly in the system's memory. The Java Virtual Machine loads classes to be executed from the class files. According to one embodiment of the invention, at least some of the constants from the constant pool of a class are stored in objects separate from the class. The corresponding constants in the constant pool are replaced with links to the objects that contain the respective constants. For other classes, constants are replaced with links to objects containing the respective constants. Objects containing the constants are shared between multiple classes that link to them. For example the constant pools of both class A and class B may have a string "ClassNameC." An object containing "ClassNameC" is created, and In the constant pools of both class A and B, the constant "ClassNameC" is replaced with a link to the object containing "ClassNameC." According to one embodiment of the invention, all strings from constant pools of the various classes are stored in objects separate from the classes, but only commonly used strings are shared among different classes.

Thus, an advantage of such an approach is that memory is conserved that would otherwise be wasted by constant pool entries redundant across various classes. Additionally, since the constants are stored in objects linked to by the classes, the objects containing the constants can be garbage collected when they are no longer needed. This is possible because one implementation of a garbage collection program frees up memory used by objects to which no other object links. Thus, after the classes linking to the objects containing the constants have been garbage collected, the objects containing the constants can also be garbage collected.

Java is often run dynamically. Java classes are often loaded dynamically as they are needed. This loading may take place even over a network. Thus, the Java virtual machine can access classes from a variety of different locations, including local source, for example, on a hard drive, and from remote sources, for example, from a remote server via the Internet. Instructions are stored as bytecode, and the bytecode is executed by a Java Virtual Machine. The bytecode is lower level code than a high level language that is run by an interpreter, and is higher level than a program compiled into machine code. The design of the Java programming language helps to allow Java to run on a number of different local systems, provided that the local systems have a Java Virtual Machine or equivalent. Thus, Java applications can be distributed widely, for example via the Internet.

Figure 1:
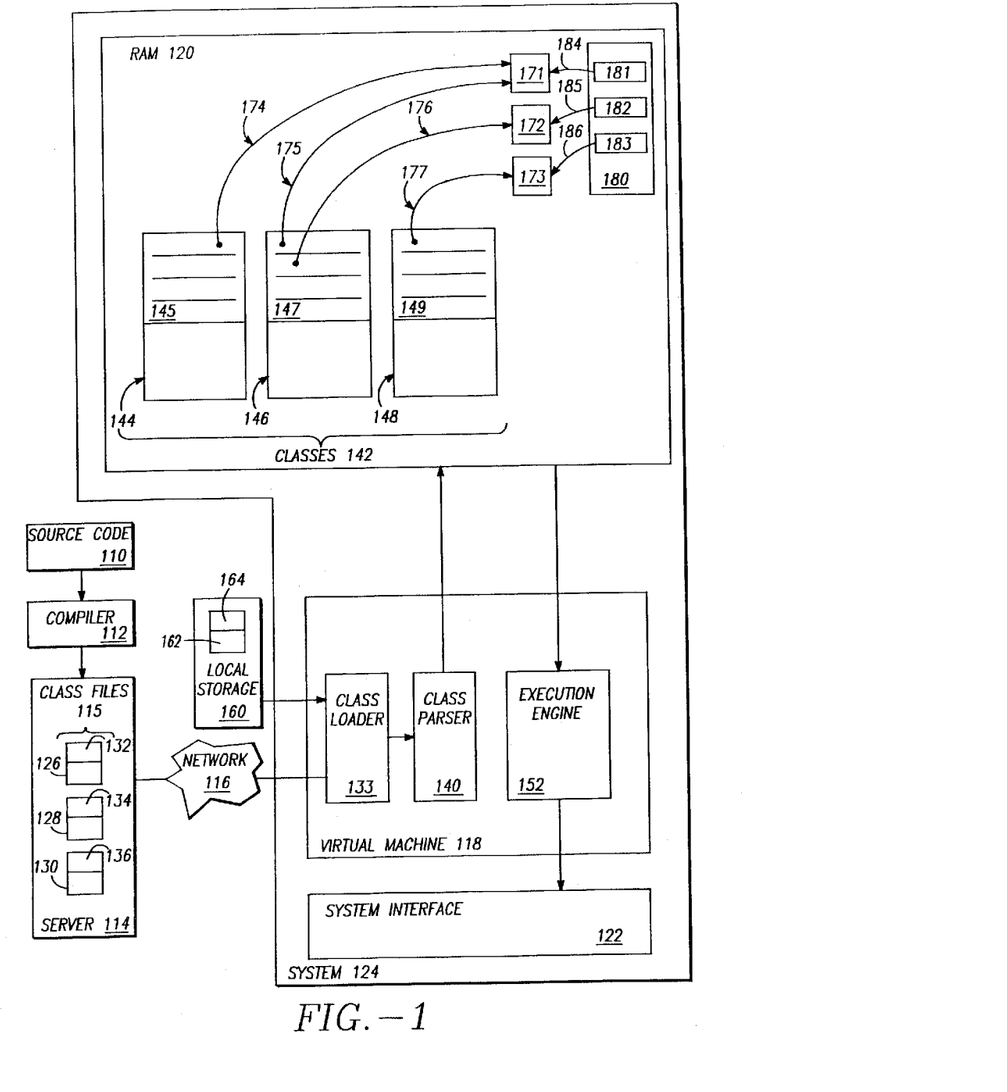
FIG. 1 is block diagram of a virtual machine, memory, and system, according to an embodiment of the invention.

FIG. 1 is block diagram of a virtual machine, memory, and system, according to an embodiment of the invention. Source code 110 is provided to compiler 112. Compiler 112 outputs a set of class files 115 which may be stored on server 114. System 124 receives class files 115 via network 116. System 124 includes virtual machine 118, system interface 122, and RAM 120. RAM 120 includes classes 142, objects 171, 172, and 173, and hash table 180. Virtual machine 118 includes class loader 138, class parser 140, and execution engine 152.

Network 116 may comprise the Internet, or other network such as a LAN or an enterprise network. Virtual machine 118 may be implemented in software, hardware or both hardware and software. Virtual machine 118 may comprise a Java Virtual machine or may comprise another system capable of executing the methods in the classes.

The class files 115 on server 114 include a constant pool for each class. For example, class 126 includes constant pool 132, class 128 includes constant pool 134, and class 130 includes constant pool 136. The constants stored within these constant pools within class files may be redundant between the respective class files. The class files 115 also include methods, which have bytecode instructions. Class loader 133 loads respective class files 115 via network 116. Additionally, local storage 160 may include class files, such class file 162, including constant pool 164. Local storage 160 may comprise flash memory, a hard drive, a CD, other memory device, or a combination of these. Class loader loads class files as they are needed dynamically as virtual machine 118 requires. For example, some class files may be loaded initially, and then, as a reference to another class is encountered during execution of the earlier loaded class files, additional class files are loaded. Some class files may be preloaded into memory. Instead of RAM, according to an embodiment of the invention, some classes may be stored in ROM.

Class parser 140 parses through class files and stores the data for the class files into RAM 120. RAM 120 may include the heap, such that classes 142 and global constant pool are stored on the heap. In parsing classes, class parser 140 identifies constants from the respective constant pools of classes. Class parser 140 creates objects 171, 172, and 173, and stores constants from the constant pools of classes into such objects.

According to one embodiment of the invention, only string constants are stored in such objects. Further, in one implementation, for commonly used constants, such as class name strings, a check is first made to determine whether the constant already exists in an object (such as an object among 171, 172, and 173). For less commonly used string constants, a new object is created for each constant without first checking to determine whether the constant already exists in an object. An advantage of such an approach is that the processing time in determining whether the constant has already been saved is avoided for constants that are less likely stored in the objects. Hash table 180 is used to determine whether a constant has a corresponding object. For example, entries 181, 182, and 183 point to objects 171, 172, and 173 respectively. When commonly used string constants from a new class are loaded, hash table 180 may be queried to determine links to the corresponding objects. For example, entry 181 may have been used to find object 171 when class 146 was loaded.

Constants from constant pools of classes 142 are replaced with links to the corresponding objects containing the constants. For example, in table 145 of class 144, link 174 to object 171 has replaced a constant. The corresponding constant is included in object 171. Class 146 included the same constant, and that constant is replaced by link 175 to object 171. Thus, object 171 is shared by class 144 and 146, and memory is saved as a result. Link 176 from table 147 of class 146 links to object 172. Object 172 includes the constant replaced by link 176. Link 177 from table 149 of class 148 links to object 173. Object 173 includes the constant replaced by link 177. Hash table 180 points to objects, such as objects 181, 182, and 183, with weak links. The garbage collector typically ignores weak links when garbage collecting so that if only a weak link points to an object, it can be garbage collected. Thus, if all the classes linking to an object are garbage collected, then the object can also be garbage collected. An advantage of such an approach is that it allows constants to be shared between classes, thus saving memory, and for the constants to be garbage collected when not needed, also resulting in a savings of memory.

Execution engine 152 supports object oriented code, including the creation of instances and invocation of methods. Execution engine 152 interprets the bytecodes from class 142 as required to execute requested methods. Execution engine 152 automatically follows links to the constants stored in objects to find constants as needed during runtime. Execution engine is coupled to system interface 122, which executes operations requested by execution engine 152. One embodiment, system interface 122 comprises an operating system, which may interface to a file system. And another embodiment to the invention, system interface 122 is simply a file system, so that execution engine 152 is coupled directly to a file system, and the system 124 does not have an operating system. Such a configuration is advantageous where there is a premium on memory. And in this manner, in combination with the use of objects 171, 172, 173, links, and lack of an operating system, the need for memory is reduced.

The functionality of the class parser 140 may be combined into class loader 138. In one embodiment of the invention, class loader 138 represents the only class loader in virtual machine 118, and is modified to include the functionality of class parser 140. In such an embodiment, class loader 138 represents the system class loader. In an another embodiment of the invention, class loader 138, combined with the functionality of class parser 140 is a separate instance, and is independent of the system class loader.

According to one embodiment of the invention, a class is parsed immediately after it is loaded. According to another embodiment of the invention, a class is parsed after a series of classes have been loaded by class loader 138. According to another embodiment of the invention, at least some classes are preparsed. In preparsing constants are identified that can be stored separately from the classes. These constants may be stored in ROM. The corresponding preparsed classes may also be stored in ROM. Such an approach has the advantage of further conserving the use of RAM.

In one embodiment of the invention, the structure described here may be applicable to data structures other than Java class files. For example, in one embodiment of the invention, data structures other than class files 115 are stored on a server such as server 114. These data structures include instructions and constants. These data structures may also be stored on local storage 160. When these data structures are loaded onto system 124, the instructions portions of the data structures are stored separately in RAM 120 from at least some of the constants, which are stored, for example in objects 171, 172, and 173. Such constants can be shared between the various data structures.

System 124 in one embodiment of the invention is a small appliance that has a minimum of RAM 120. System 124 may comprise a set top box that is coupled to a television, a game console, a web phone, or other small device. Another embodiment to the invention, system 124 comprises a computer system, such as a desktop computer. Other embodiments of system 124 are also possible.

Figure 2:
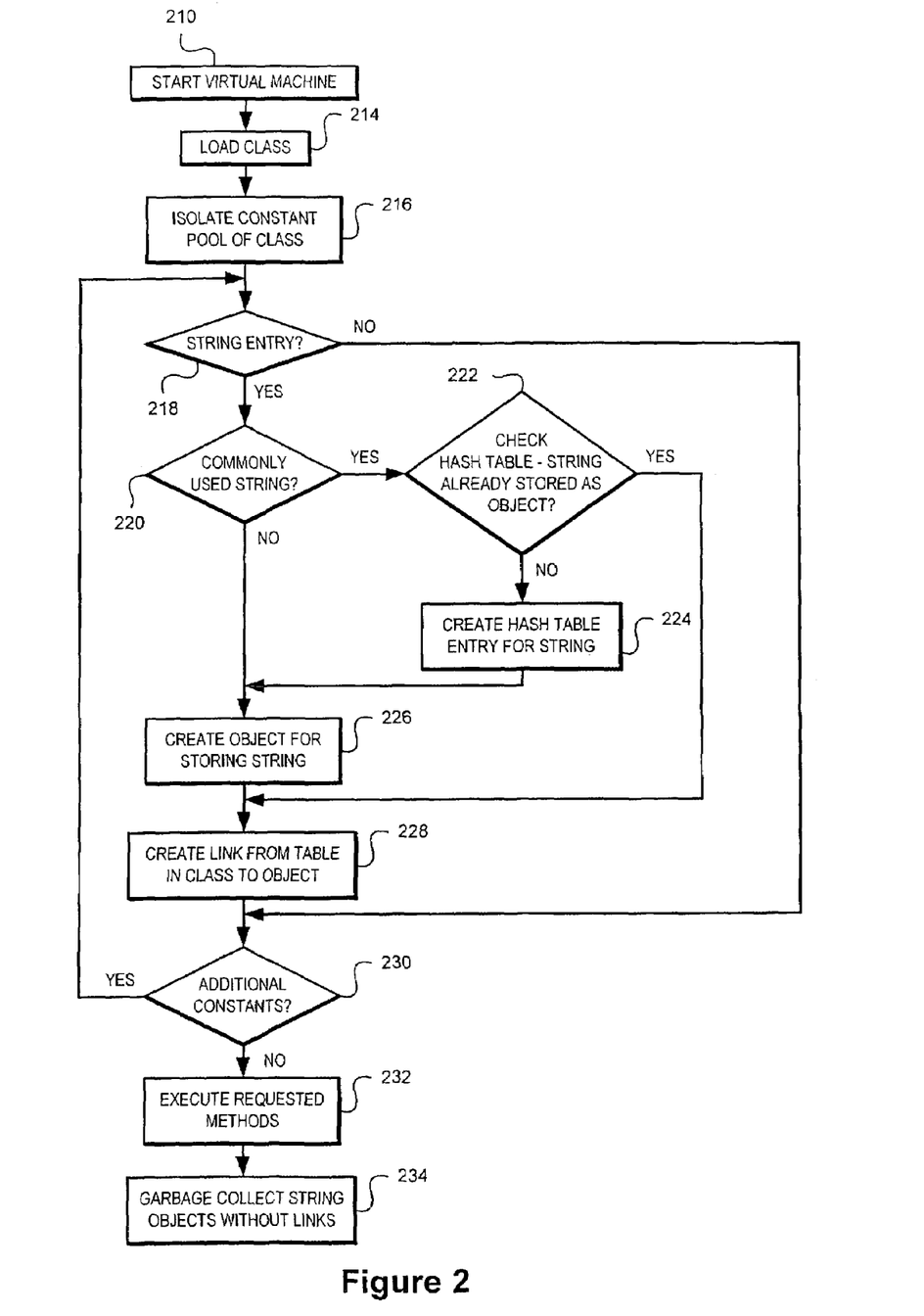
FIG. 2 is a flow chart of a method of loading classes into memory, according to an embodiment of the invention.

FIG. 2 is a flow chart of a method of loading classes into memory, according to an embodiment of the invention. First start virtual machine (block 210). Load a class (block 214). Such a class may be obtained from a class file for example, over the Internet from a remote server or from a local storage. Next, isolate the constant pool of the class (block 216).

According to one embodiment of the invention, only the string entries of the constant pool are replaced by links to respective objects outside of the class. For example, as shown here, first determine whether the member of the constant pool is a string entry (block 218). If the member is not a string, then proceed to block 230 to determine whether there are additional constants from the constant pool. If the member is a string entry, then determine whether it is a commonly used string (block 220). If the member is not a commonly used string, then create an object for storing the string (block 226), without determining whether the string has already been stored in a separate object. If the entry is a commonly used string, then check a hash table to determine if the string has already been stored in an object (block 222). A commonly used string may be, for example, a name of a class such as the name of a Java class. A string that is not a commonly used string, may be some arbitrary string, such as "hello world." If the string has already been stored as an object, then proceed to block 226 to create a link from the table in the class to the object. If the string has not been already stored as an object, then create a hash table entry for the string (block 224). Create an object for storing the string (block 226), and the hash table entry points to the object. Then, proceed to create a link from the table in the class to the object (block 228).

Such actions are performed for additional constants, provided that additional constants are present in the class pool (see block 230). Next, additional classes may be loaded, and the actions described may be performed on such additional classes. Alternatively, requested methods may be executed immediately (block 232). Thus, classes may be loaded dynamically and redundancies between constants from the various classes can be spared as such classes are loaded dynamically. An advantage to such an approach is that newly loaded classes can be efficiently stored in RAM by sharing certain constants between such newly loaded classes and constants already stored in memory (RAM of ROM).

Next, garbage collect string objects without links (block 234). Since such constants are stored in objects, one example of a garbage collector automatically garbage collects such objects when the garbage collector cannot find any links to those objects. Thus, when classes linking to respective objects are garbage collected, the respective objects including constants are garbage collected also.

Figure 3:
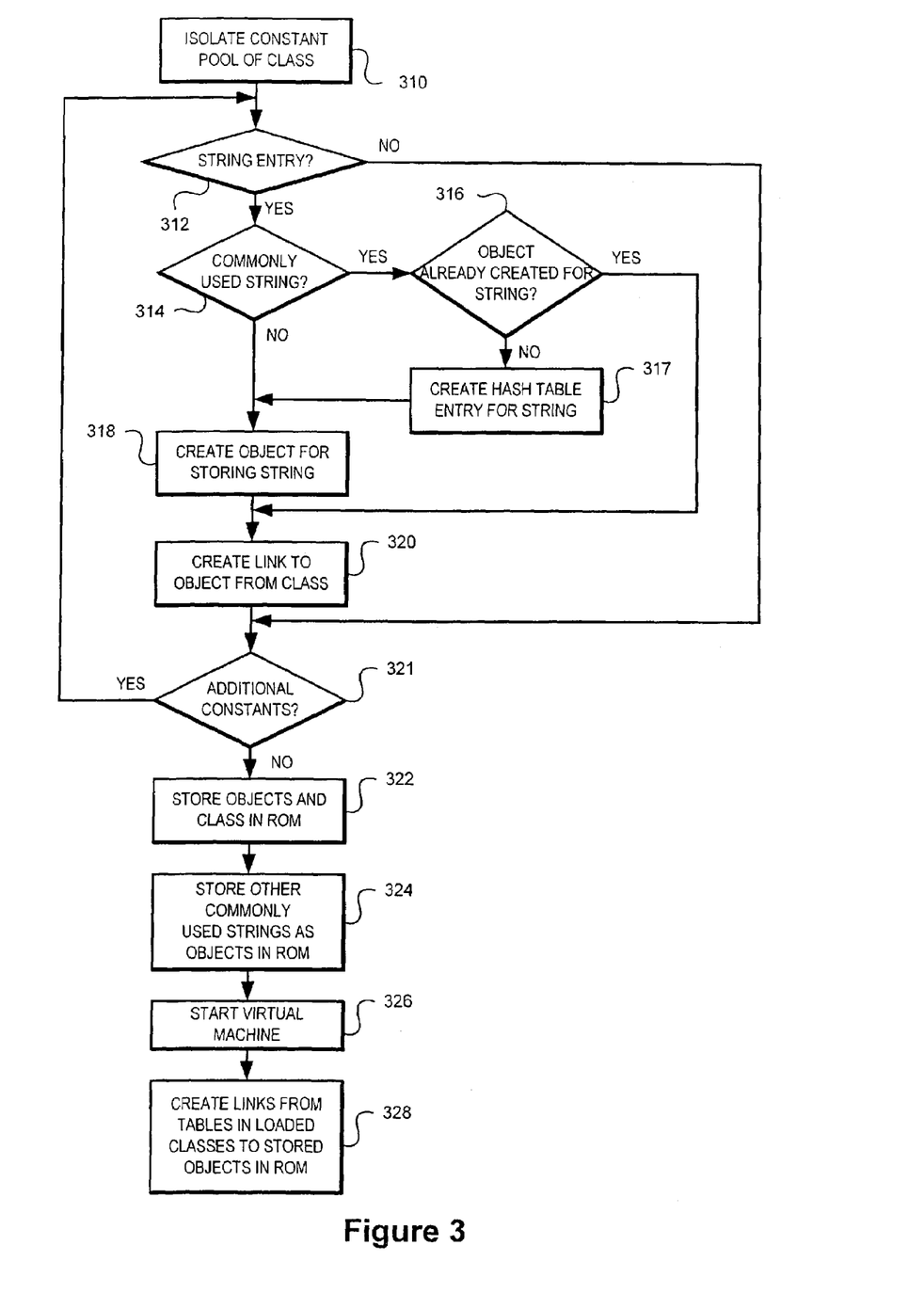
FIG. 3 is a flow chart of a method of storing classes in ROM, according to an embodiment of the invention.

FIG. 3 is a flow chart of a method of storing classes in ROM, according to an embodiment of the invention. According to FIG. 3, certain classes and constants are stored in ROM in order to conserve space in RAM. Various constants from the respective classes are stored separately from the classes and shared among the respective classes in order to save additional space in the ROM and also to save space in RAM as classes later on are loaded into RAM later.

First isolate the constant pool (block 310). If an entry in the constant pool is not a string entry (block 312), then proceed to block 321 to determine if additional constants are present in the constant pool. Otherwise, determine whether the member is a commonly used string (block 314). If the member is a commonly used string, then proceed to block 316 to determine whether an object has already been created for the string. If an object has already been created for the string, then proceed to block 320 to create a link to the object including the string from the class. If an object has not already been created for the string, then create a hash table entry for the string (block 317). This hash table entry can then later on be used to determine whether an object including the string is present in memory so that the object need not be created and instead a link to the existing object may be created. If the member is not a commonly used string (block 314), then proceed to block 318 to create an object for storing the string. Thus, strings that are not commonly used, according to one embodiment of the invention, are not shared between different classes. Note that the determination made in block 316 regarding whether an object has already been created for the string may be made by the hash table in which entries are created in block 317. The various members of the constant pool are parsed according to the steps described until all constants have been parsed (block 321).

The objects containing the constants and the class are stored in ROM (block 322). In this way, RAM is spared for these objects and constants that are preprocessed. The objects in ROM containing constants may be reused by other classes that are loaded dynamically later on during run time (as shown in block 328). Other commonly used strings, or other constants, may be stored as objects in ROM (block 324). Thus, a determination may be made, without actually parsing respective classes, of constants that would be needed by various classes, and these constants may be stored in ROM. Eventually a virtual machine is started (block 326). As noted, links from tables loaded in classes during run time may be created to the objects stored in ROM (block 328). In this way, redundancies between commonly used constants from the respective classes are avoided.

When constants are stored in objects separately from class files, certain optimizations may be implemented. For example, commonly repeating portions of constants may be replaced by shorter codes. For example, java/lang/may be replaced with a code, such as $1.

The methods and systems described above also apply in applications other than Java classes. For example, these methods and systems may be applicable to computer systems using other object oriented programming schemes. Alternately, these methods and systems may more generally be applied to the loading of data structures from memory, where the data structures include instructions and constants.

Various embodiments of the invention have been illustrated in the figures and have been described in the corresponding text of this application. This foregoing description is not intended to limit the invention to the precise forms disclosed. Rather, the invention is to be construed to the full extent allowed by the following claims and their equivalents.

The invention claimed is:

1. A computer readable medium, comprising program instructions computer executable to:
   store, within a data structure external to a first executable object, a copy of a first constant included within the first executable object;
   determine whether a second executable object includes a second copy of the first constant; and
   in response to determining that the second executable object includes the second copy, replace the second copy within the second executable object with a pointer to the data structure.

2. The computer readable medium as recited in claim 1, wherein the instructions are further computer executable to: replace the first constant within the first executable object with a pointer to the data structure.

3. The computer readable medium as recited in claim 1, wherein the first executable object includes a plurality of constants, wherein the instructions are further executable to:
   select the first constant from the plurality of constants for storage within the data structure based on one or more selection criteria.

4. The computer readable medium as recited in claim 3, wherein said selecting comprises:
   selecting the first constant if the first constant represents an object of a first data type.

5. The computer readable medium as recited in claim 3, wherein said selecting comprises:
   selecting the first constant based on a prediction of a probability of references to the first constant from a plurality of executable objects.

6. The computer readable medium as recited in claim 1, wherein the executable object is an executable class derived from source code written in a platform-independent programming language, wherein said executable class is executable within a virtual machine process.

7. The computer readable medium as recited in claim 1, wherein the instructions are further executable to:
   receive the first executable object from a first computing device at a second computing device over a network;
   wherein said storing is performed at the second computing device.

8. The computer readable medium as recited in claim 7, wherein the second computing device is a set top box coupled to at least one of a television, a game console, and a web phone.

9. The computer readable medium as recited in claim 1, wherein the data structure is stored within a read-only memory (ROM) device.

10. A system, comprising:
    a processor,
    a memory coupled to the processor, wherein the memory includes program instructions executable by the processor to:
      store, within a data structure external to a first executable object, a copy of a first constant included within the first executable object;
      determine whether a second executable object includes a second copy of the first constant; and
      in response to determining that the second executable object includes the second copy, replace the second copy within the second executable object with a pointer to the data structure.

11. The system as recited in claim 10, wherein the instructions are further computer executable to:
    replace the first constant within the first executable object with a pointer to the data structure.

12. The system as recited in claim 10, wherein the first executable object includes a plurality of constants, wherein the instructions are further executable to:
    select the first constant from the plurality of constants for storage within the data structure based on one or more selection criteria.

13. The system as recited in claim 12, wherein said selecting comprises:
    selecting the first constant if the first constant represents an object of a first data type.

14. The system as recited in claim 12, wherein said selecting comprises:

selecting the first constant based on a prediction of a probability of references to the first constant from a plurality of executable objects.

15. The system as recited in claim 10, wherein the executable object is an executable class derived from source code written in a platform-independent programming language, wherein said executable class is executable within a virtual machine process.

16. The system as recited in claim 10, wherein the instructions are further executable to:
   receive the first executable object from a first computing device;
   wherein the processor is included within a set top device coupled to the first computing device over a network, and wherein the set top device is further coupled to at least one of a television, a game console, and a web phone.

17. A computer implemented method, comprising:
   storing, within a data structure external to a first executable object, a copy of a first constant included within the first executable object;
   determining whether a second executable object includes a second copy of the first constant; and
   in response to determining that the second executable object includes the second copy, replacing the second copy within the second executable object with a pointer to the data structure.

18. The method as recited in claim 17, further comprising:
   replacing the first constant within the first executable object with a pointer to the data structure.

19. The method as recited in claim 17, wherein the first executable object includes a plurality of constants, further comprising:
   selecting the first constant from the plurality of constants for storage within the data structure based on one or more selection criteria.

20. The method as recited in claim 19, wherein said selecting comprises:
   selecting the first constant if the first constant represents an object of a first data type.

21. The method as recited in claim 19, wherein said selecting comprises:
   selecting the first constant based on a prediction of a probability of references to the first constant from a plurality of executable objects.

22. The method as recited in claim 19, further comprising:
   receiving the first executable object from a first computing device at a second computing device over a network;
   wherein said storing is performed at the second computing device.

23. The method as recited in claim 22, wherein the second computing device is a set top box coupled to at least one of a television, a game console, and a web phone.

24. A computer readable medium, comprising program instructions computer executable to:
   determine whether a data structure comprising a copy of a first constant included within a first executable object exists within a specified memory region; and
   in response to determining that a data structure comprising the copy does not exist within the specified memory region,
      allocate a new data structure within the specified memory region, wherein the new data structure is external to the executable object; and
      store a copy of a first constant within the new data structure.

25. The computer readable medium as recited in claim 24, wherein the instructions are further computer executable to:
   determine whether a second executable object includes a second copy of the first constant; and
   in response to determining that the second executable object includes the second copy, replace the second copy within the second executable object with a pointer to the new data structure.

26. The computer readable medium as recited in claim 24, wherein the instructions are further executable to:
   maintain a hash table including a respective link to one or more data structures within the specified memory region, wherein each of the one or more data structures comprises a copy of a respective constant included within an executable object;
   wherein said determining whether a data structure comprising a copy of a first constant included within a first executable object exists within a specified memory region comprises querying the hash table to determine whether the hash table includes a link to a data structure comprising the copy of the fits constant.

27. The computer readable medium as recited in claim 26, wherein the specified memory region comprises a heap, wherein the hash table is maintained within the heap, and wherein each of the links included within the hash table is identified as a weak link with respect to garbage collection, wherein the instructions are further computer executable to implement a garbage collector configured for:
   identifying unreachable objects within the heap for memory reclamation, wherein said identifying comprises:
      determining whether any links other than weak links point to the new data structure; and
      in response to determining that no links other than weak links point to the new data structure, identifying the new data structure as an unreachable object to be reclaimed.

28. A computer readable medium, comprising program instructions computer executable to:
   classify a set of constants identified in a first memory region into two or more categories including a first category and a second category, wherein constants in the first category are expected to have a higher probability of common use by two or more executable objects than constants placed in the second category, wherein the first category comprises a first constant;
   determine whether a data structure comprising the first constant exists within a second memory region;
   in response to determining that a data structure comprising the first constant does not exist within the second memory region,
      allocate a new data structure within the second memory region;
      store the first constant in the new data structure; and
      replace the first constant in the first memory region with a pointer to the new data structure.

29. The computer readable medium as recited in claim 28, wherein the second category comprises a second constant, wherein the instructions are further computer executable to:
   allocate an additional data structure to store the second constant within the second memory region without determining whether a data structure comprising the second constant already exists within the second memory region; and
   replace the second constant in the first memory region with a pointer to the additional data structure.

30. The computer readable medium as recited in claim 28, wherein said classifying comprises excluding constants of a particular data type from the first category.

31. The computer readable medium as recited in claim 28, wherein the set of constants is identified within an executable class object derived from source code written in a platform-independent programming language for execution within a virtual machine process.

32. The computer readable medium as recited in claim 28, wherein the instructions are further computer executable to:

receive the set of constants from a first computing device at a second computing device over a network, wherein said classifying is performed at the second computing device, and wherein the second computing device is included within a set top box coupled to at least one of a television, a game console, and a web phone.

* * * * *